United States Patent [19]

Hu et al.

[11] 3,768,976

[45] Oct. 30, 1973

[54] TEMPERATURE-TIME INTEGRATING INDICATOR

[75] Inventors: Kwoh H. Hu, Weston; Joseph D. Loconti, Natick, both of Mass.

[73] Assignee: The United States of America as represented by the Secretary of the Army, Washington, D.C.

[22] Filed: May 20, 1971

[21] Appl. No.: 145,146

[52] U.S. Cl. ....... 23/254 R, 23/253 TP, 116/114 V, 99/192 TT
[51] Int. Cl. ......................................... G01m 31/00
[58] Field of Search............. 116/114, 114 V, 114.5; 73/356; 23/230 LC, 253 TP, 254 R; 99/192 TT, 174; 204/195; 252/408; 58/1

[56] References Cited
UNITED STATES PATENTS

| | | | |
|---|---|---|---|
| 3,000,706 | 9/1961 | Royce | 23/254 R X |
| 3,018,611 | 1/1962 | Biritz | 58/1 |
| 3,065,083 | 11/1962 | Gessler | 99/192 TT |
| 3,243,303 | 3/1966 | Johnson | 99/192 TT |
| 3,480,402 | 11/1969 | Jackson | 23/254 R |
| 3,520,124 | 7/1970 | Myers | 58/1 |

*Primary Examiner*—Louis J. Capozi
*Attorney*—Harry M. Saragovitz, Edward J. Kelly, Herbert Berl and Charles C. Rainey

[57] ABSTRACT

A temperature-time integrating indicator for determining the safe limit of storage of a food product or other material which is subject to deterioration due to temperature and length of storage. In its preferred form the temperature-time integrating indicator comprises a transparent polymeric film package containing a warning message enclosed in the package together with an aqueous solution of a redox dye, e.g., sodium anthraquinone beta-sulfonate. The dye is in its reduced state, which is dark red and obscures the warning message. The rate of permeation of oxygen into the package is a function of the temperature at which the package is exposed to the atmospheric environment. When sufficient time has elapsed at temperatures which may vary, the due becomes oxidized, turning colorless and revealing the warning message. The effects of temperature and time on the migration of oxygen through the polymeric film followed by reaction of the oxygen with the redox dye in the solution are integrated. This is related to product deterioration in storage, since the rate of this deterioration also depends on the temperature history and the time of storage. The use or disposal of stored foods and the like may be scheduled in accordance with warnings provided by the temperature-time integrating indicators.

9 Claims, 4 Drawing Figures

PATENTED OCT 30 1973 3,768,976

Inventors:
Kwon H. Hu,
Joseph D. Loconti, by Harry M. Saragovitz, Edward J. Kelly, Herbert Berl &
Charles C. Rainey
Attorneys

TEMPERATURE-TIME INTEGRATING INDICATOR

The invention described herein may be manufactured, used, and licensed by or for the Government for govermental purposes without the payment to us of any royalty thereon.

This invention relates to a temperature-time integrating indicator for use in an atmospheric environment for determining the safe limit of storage of a packaged food product or other material. Generally, most materials deteriorate with time. The rate of this deterioration is accelerated as the storage temperature is increased. The maximum storage life of a canned pound cake was determined to be 6 months at 100°F., 2 years at 70°F., or 4 to 5 years at 47°F.

The Armed Forces have a great responsibility for maintaining the health and fitness of all of their personnel. An ill or poorly nourished fighting man is a handicap to his operational unit and may be a source of considerable expense to the Government. It is most important, therefore, that every reasonable precaution be exercised to insure that the foods provided to the members of the Armed Forces are nutritious, safe, and acceptable for consumption. Experience has proven that if a food has an off-odor or off-flavor or other undesirable characteristics which develop with the passage of time and exposure of the food to oxygen at elevated temperatures, even in a food that has been sterilized or thoroughly dehydrated so that microorganisms will not multiply therein, it may prove to be unacceptable to a soldier in the field and may be discarded. Thus, the soldier fails to receive the nutritional values he needs and that for which the Government has expended much money; and the efforts expended in providing the food have been wasted.

Time cycles along have proven very inadequate for scheduling storage limits for food products since temperatures experienced are most important and the longer the time of exposure at elevated temperatures, the more rapid the deterioration of the food products.

It is, therefore, an object of the invention to provide a temperature-time integrating indicator which indicates when a predetermined combination of temperatures and times of exposure to these temperatures has occurred and which gives a clear and unequivocal warning that a specified action should be taken with respect to a product.

Another object of the invention is to provide an economical device for attachment or maintenance in close proximity to each package or case or other quantity of packages of food products to indicate when the food should be discarded or when it should be used without delay in view of the exposure of the food to a combination of temperatures and times which could with reasonable certainty be expected to have caused a predetermined amount of deterioration of the food.

Another object is to provide a simple device for determining the safe limit of storage of a food and for indicating what action should be taken with respect to the food to forestall further deterioration of the food to the point of developing a health hazard therein or a condition which would be likely to result in poor acceptability of the food.

A further object of the invention is a series of temperature-time integrating indicators which may be conveniently attached to or otherwise closely associated with a container holding a food and which will convey a series of messages of progressively increasing urgency for use of the food and finally a message requiring the discarding of the food, the different messages being based on different combinations of temperature and time, the final message appearing after sufficient exposure to conditions which have been found to destroy the acceptability or, in some cases, the safety of the food for human consumption.

With these and other objects and advantages in mind, we shall now set forth, by way of example, various embodiments of our invention and of the manner in which the same may be practiced. It will be understood, of course, that such examples are by no means exhaustive of the many variations of which the practice of our invention is capable without departing from the spirit thereof.

One form of temperature-time integrating indicator embodying the principle of our invention is illustrated in the appended drawings, wherein:

FIG. 1 is a plan view of a temperature-time integrating indicator comprising a transparent outer film pouch containing two transparent inner film pouches, each filled with an oxidizable solution of a redox dye in its reduced form. The redox dye is opaque and, therefore, renders invisible any message which is present on a piece of white fabric which is held within each inner film pouch. Both of the inner pouches and the outer pouch are heat sealed along all four sides thereof. FIG. 1 shows the indicator immediately following assembly thereof and before enough time has elasped for either of the inner pouches to become clear and to reveal the message therein.

Figure 1:
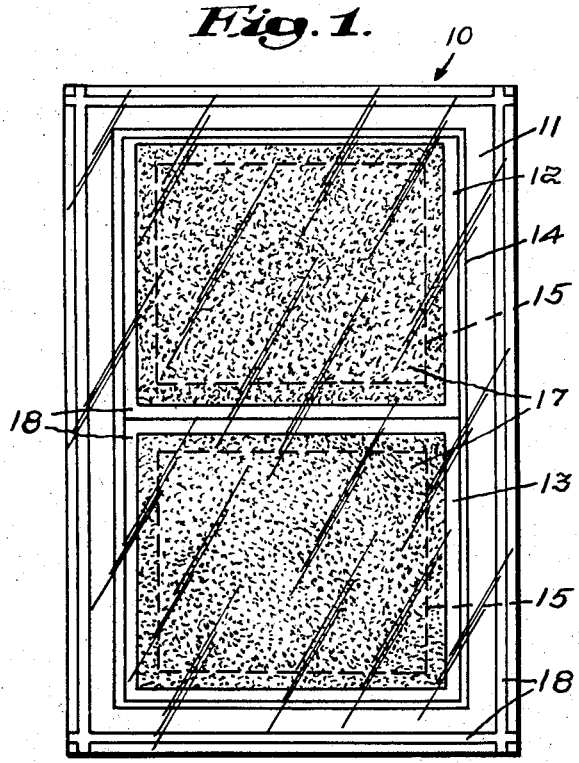
Figure 2:
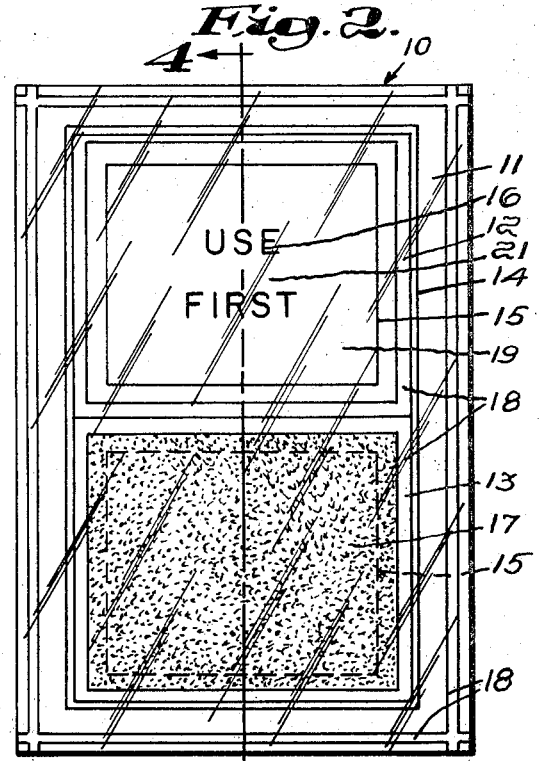
FIG. 2 is a plan view of the same type of integrating temperature-time indicator as in FIG. 1, but after sufficient time has elapsed for the upper inner pouch to reveal the message incorporated therein due to oxidation of the redox dye to its colorless form, but before enough time has elapsed for the lower inner pouch to reveal its message.
Figure 3:
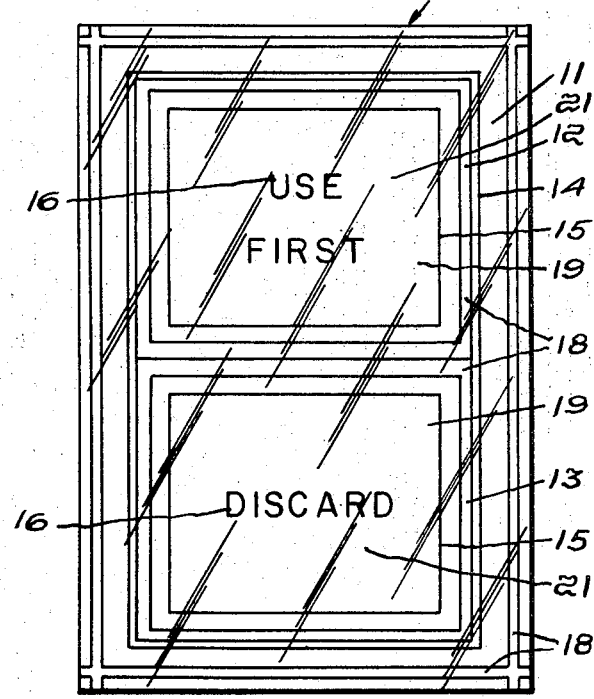
FIG. 3 is a plan view of the same type of integrating temperature-time indicator as in FIG. 1, but after sufficient time has elapsed for both the upper inner pouch and the lower inner pouch to reveal the messages incorporated therein due to oxidation of the redox dye to its colorless form.
Figure 4:
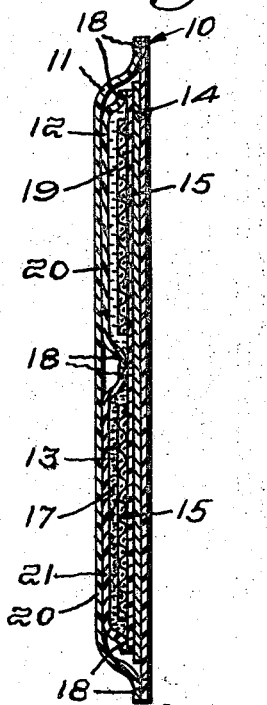
FIG. 4 is a cross-sectional view along the line 4—4 in FIG. 2.

In the drawing, reference numeral 10 designates generally the temperature-time integrating indicator which comprises an outer pouch 11, an upper inner pouch 12, a lower inner pouch 13, and a cardboard backing 14 to keep the two inner pouches relatively flat so that the solution therein will be spread out uniformly within each inner pouch. Each of the inner pouches contains a message-conveying means 15, which may be a piece of fabric or paper which will not disintegrate in an aqueous solution of the type used in the inner pouches. The message-conveying means has a message 16 applied thereto with indelible ink or other mateiral that will not run or dissolve in the type of aqueous solution used in the inner pouches. Each inner pouch contains a legibility-controlling means 17 which may be an aqueous solution of a redox dye in its reduced state, which is opaque. The fabric or paper of the message-conveying means may be dyed or pigmented so that its color will closely correspond to that of the legibility-controlling means when it is in its chemically reduced state, thus reducing the contrast between the message and the background of the message-conveying means. The inner and outer pouches have heat seals 18 along each of the four edges of each pouch which are applied thereto to completely seal each pouch against the escape of the solutions and to restrict the influx of oxygen sufficiently to permit the device to act as a temperature-time integrating indicator. Reference numeral 19 designates the aqueous solution of the redox dye after it has become oxidized sufficiently to become colorless and render the message 16 legible. Reference numeral 20 designates a transparent portion of the outer pouch and reference numeral 21 designates transparent portions of the inner pouches through which the message-conveying means 15 may be observed.

The preferred manner of carrying out our invention will be described in the following examples.

EXAMPLE 1

Forty grams of sodium anthraquinone beta-sulfonate, 40 grams of zinc dust, and 130 grams of sodium hydroxide pellets were mixed with sufficient water to make 1 liter of solution, which was maintained free from air. Flat pouches 2-½ × 3-½ inches in dimensions were made by heat sealing along three sides a pair of superimposed sheets of a laminate composing four layers, namely an outer layer of 1 mil thick low density polyethylene, next layer of 2 mils thick trifluoromonochloroethylene of a high moisture protective type, next a layer of 0.75 mil thick polyethylene terephthalate, and finally the inner layer of low density polyethylene having a weight of 2.2 pounds per ream. Four milliliter quantities of the above solution were introduced into each of four of the above pouches together with a piece of filter paper having the word "Discard" printed thereon with indelible ink. Each pouch was then heat sealed along the fourth side. The width of the heat seal along each of the four sides of each pouch was about three-eighth inches. Each pouch was swept out with nitrogen prior to the filling and sealing thereof. The solution in each pouch was blood red, obscuring the word "Discard" printed on each piece of filter paper within each pouch. The sealed pouches were then kept in an air atmosphere at four different temperatures and the lengths of time required for the solutions in the pouches to become substantially clear and reveal the word "Discard" were observed for the pouches stored at the various temperstures. The following tabulation shows the times required for the word "Discard" to become legible at the four different temperatures:

| Temperature (Degrees F) | Time (Days) |
|---|---|
| 32 | 35 |
| 75 | 15 |
| 100 | 9 |
| 130 | 7 |

EXAMPLE 2

This example involves the use of the pouch construction shown in the drawing and previously described in general terms.

A large outer pouch and two smaller inner pouches backed by a sheet of cardboard are employed, the inner pouches being filled with solutions of a redox dye of such concentrations as will absorb different amounts of oxygen before turning colorless and revealing a message on a fabric inclosed in each inner pouch. Thus the solutions in the two inner pouches change from opaque to clear at different times. The time intervals of the changes from opaque to clear depend on the temperature exposures of the pouches. The message on the fabric in the upper inner pouch in each large outer pouch reads, "Use First". The message on the fabric in the lower inner pouch in each large outer pouch reads, "Discard".

The inner pouches are made by heat sealing two sheets of a laminate together along each of three sides, the sheets being 3-¼ × 3-¾ inches in dimensions, the heat seals being about three-eighths inches from the edges of the sheets to the inner edges of the heat seals. The sheets for the inner pouches are made of an outer layer of 1 mil thick polyethylene terephthalate film and an inner layer of 2 mils thick low density polyethylene film.

The outer pouches are made by heat sealing two sheets of a laminate together along each of three sides, the sheets being 5 × 7-¼ inches in dimensions, the heat seals being about three-eighths inches from the edges of the sheets to the inner edges of the heat seal. The sheets for the outer pouches are made of an outer layer of 3 mils thick polyethylene terephthalate film and an inner layer of 1.5 mils thick medium density polyethylene film.

Solution 1, to be used in the upper pouches, is made by mixing 30 grams of sodium anthraquinone beta-sulfonate, 40 grams of zinc dust, and 130 grams of sodium hydroxide pellets with sufficient water to make 1 liter of solution, which is maintained free from air by constantly purging with nitrogen gas in a reaction flask.

Solution 2, to be used in the lower pouches is made by mixing 50 grams of sodium anthraquinone beta-sulfonate, 40 grams of zinc dust, and 130 grams of sodium hydroxide pellets with sufficient water to make 1 liter of solution, which also is maintained free from air by constantly purging with nitrogen gas in a reaction flask.

A piece of white fabric having the message, "Discard", applied thereto with indelible ink is slipped into each of three of the small pouches to serve as the lower inner pouches of three sets of indicators to be exposed at three different temperatures. Each of these three pouches is purged free of oxygen by sweeping its interior out with nitrogen. Then, one at a time these pouches are filled with the indicator solution by adding approximately 8 milliliters of Solution 2 thereto from a Cole-Parmer digital dispenser and quickly heat sealing the pouch along the fourth side in a manner similar to the sealing of the first three sides. Each of these small pouches, when slipped into one of the large outer pouches, is positioned at the bottom of the outer pouch. A sheet of cardboard is inserted in each outer pouch of large enough size to provide a stiff backing for the lower inner pouch as well as the upper inner pouch after it is introduced into the outer pouch.

A piece of white fabric having the message, "Use First", applied thereto with indelible ink is slipped into each of three of the small pouches which are to serve as the upper inner pouches of three sets of indicators. Each of these three small pouches is purged free of oxygen by sweeping its interior out with nitrogen. Then, one at a time these pouches are filled with the indicator solution by adding approximately 8 milliliters of Solution 1 thereto from a Cole-Parmer digital dispenser and quickly heat sealing the pouch along the fourth side in a manner similar to the sealing of the first three sides. Each of these small pouches is slipped into one of the large outer pouches above the lower inner pouch, both of the inner pouches being backed up by the sheet of cardboard. Each of the large outer pouches is vacuum sealed at 22 inches vacuum of mercury. The outer pouch is thereby drawn against the inner pouches, making the solutions in the inner pouches evenly distributed in the pouches. Another advantage of vacuum sealing the outer pouch is to prevent the two inner pouches from shifting positions during handling and transportation.

One of the above described sealed outer pouches, which contains an upper small pouch and a lower small pouch in both of which the message on the fabric therein is obscured by the blood red solution of sodium anthraquinone beta-sulfonate in its reduced form, is placed in a storage area containing air and held at approximately 130°F. air along with containers of a packaged food which is known to become unfit for consumption after approximately 40 days of storage at about 130°F. After 12 days of storage, the solution in the upper inner pouch turns substantially clear and the message, "Use First", becomes legible. This provides a warning that one should not delay in using the food being stored under these conditions. On the 40th day, the lower pouch turns clear and the message, "Discard", becomes legible. This provides a warning that the food that was being stored under these conditions should not be used, but instead, discarded.

Another of the above described sealed outer pouches, which contains an upper small pouch and a lower small pouch in both of which the message on the fabric therein is obscured by the blood red solution of sodium anthraquinone beta-sulfonate in its reduced form, is placed in a storage area containing air and held at approximately 100°F. along with containers of a packaged food which is known to become unfit for consumption after approximately 80 days of storage at about 100°F. After 22 days of storage, the solution in the upper inner pouch turns substantially clear and the message, "Use First", becomes legible. This indicates that one should speed up the use of the containers of food being stored under these conditions so as to avoid or minimize the amount of spoilage and loss of the foods. On the 82nd day, the lower pouch turns clear and the message, "Discard", becomes legible, indicating that the remaining unused containers of food would be unfit for consumption, and therefore, should be discarded.

Another of the above described sealed outer pouches, which contains an upper and a lower small pouch in both of which the message on the fabric is obscured, is placed in a storage area containing air and held at approximately 72°F. along with containers of a packaged food which is known to become unfit for consumption after approximately 160 days of storage at about 72°F. After 43 days of storage, the solution in the upper inner pouch turns substantially clear and the message, "Use First", becomes legible, indicating the advisability of using these packages of food as soon as possible to avoid spoilage. On the 161st day, the lower pouch turns clear and the message, "Discard", becomes legible, indicating the need to dispose of the remaining packages of this particular lot of food without permitting consumption thereof.

Warning messages intermediate between the message, "Use First", and the message, "Discard", may be provided by employing a third inner pouch having an intermediate quantity or concentration of sodium anthraquinone beta-sulfonate in the solution used to fill this third pouch. For example, if approximately 40 grams of sodium anthraquinone beta-sulfonate were used in such a third solution, an intermediate warning indication would be provided in each case approximately midway between the "Use First" warning and the "Discard" warning in the above described indicators. Such a warning might assume numerous different message forms, e.g., "Finish Using Soon". In like manner, four or more inner pouches, each containing a different amount of sodium anthraquinone beta-sulfonate, may be incorporated within an outer pouch to provide warning messages or other indications of action needing to be carried out at a plurality of intervals following the beginning of storage of food products.

It is apparent that as the storage temperature is increased for a given indicator of the type described above, the time required to produce sufficient permeation of oxygen into the solutions in the inner pouches to result in oxidation of substantially all of the sodium anthraquinone beta-sulfonate therein and, therefore, in a change from the opaque blood red color of the reduced form thereof to the clear oxidized form decreases. Conversely, as the storage temperature is lowered, the time required to produce sufficient oxidation to cause a change in the solution of the sodium anthraquinone beta-sulfonate from oqaque blood red to clear increases. In general, this type of temperature-time integrating indicator should be used at temperatures above the freezing point of the solution employed therein so that oxygen which permeates the container will mix with the solution thoroughly and uniformly. Aqueous solutions are preferred, but aqueous-alchol mixtures, or other types of solutions which freeze at relatively low temperatures, may be employed.

The principle of operation of the temperature-time integrating indicator of the invention has been described above in terms of a redox dye system and a particular package thereof which, in combination, have been found to be particularly adaptable to use with packaged foods in storage. However, it is to be understood that numerous other systems may be adapted to the objectives stated above. The film, or other form of packaging material for the indicator, must be permeable to oxygen in order for the indicator to function as intended. However, the film or other material should be sufficiently thick or should comprise a sufficient number of layers of such thickness as to cause the permeation of oxygen into the indicator solution to occur at a predetermined rate so as to oxidize the component of the solution which turns clear or colorless within the time frame desired and at temperatures to which it is expected that the package of indicator will be exposed. Virtually any of the transparent polymeric films or laminates that are commercially available today will be adaptable to use in making temperature-time integrating indicators of the types contemplated by this invention since most of them are permeable to oxygen. The transparent portion may be made of other transparent material than polymeric film, e.g., glass, provided other portions of the container permit oxygen to permeate the package at a suitable rate.

The oxidizable means for controlling the legibility of the message-conveying means while the former is in its reduced state, both of which are sealed within the transparent package, may take several forms. One form thereof has been described in the examples above. In such systems, the time required to oxidize the redox dye sufficiently to permit the message to become legible through the packaging material is dependent on a number of factors including the concentration of the redox dye in the solution, the quantity of solution in the pouch, the type of film, the thickness and surface area of the film exposed to the oxygen-containing atmosphere, and the amount of reducing agent present in the solution or suspended therein. Any one of these factors may be varied while the other factors are being maintained substantially constant in order to vary the time and temperature combination which will bring about sufficient oxidation of the redox dye to reveal the message in the inner pouch. The end point is so readily controllable during preparation of the indicators that a variety of messages may be made to become legible at different times during the storage life of a product so that the product may be conducted through a carefully planned schedule to minimize the losses of the product due to spoilage or the formation of objectionable odors, flavors, et cetera.

Other systems for carrying out the invention by providing oxidizable means for obscuring message-conveying means temporarily and thereafter changing at variable rates to a form which permits a message to become legible after storage in an atmospheric environment at varying temperatures and for different time periods include, but are not limited to the following:

Copper foil surrounded by a solution of ammonia and an ammonium salt, such as ammonium chloride. The copper foil obscures the message as long as it remains intact. However, as oxygen permeates the packaging material and migrates into the solution, the copper is oxidized and dissolved, first forming cuprous ions, later copper-ammonia complexes in which the copper ultimately becomes bivalent. Eventually, sufficient copper is dissolved to allow the message to become legible through the transparent portion of the package. Instead of foil, the copper may be employed as a thin film applied to a supporting surface by a vacuum, electrical, or chemical deposition. The supporting surface for the copper film may be transparent so that a message applied on another surface behind the copperplated surface will be visible when a sufficient quantity of the copper has been dissolved by the ammonia solution. The message may also be applied to a surface and overplated with a thin film of copper obscuring the message until sufficient copper is dissolved away to make the message legible. In similar manner, a series of messages may be applied with interposed thin opaque deposits of copper. Thus a succession of messages indicating progressively greater urgency for certain steps to be taken with respect to a product in storage may be incorporated in a single pouch rather than in a plurality of pouches as shown in the drawing.

The converse of the above described systems may be employed for indicating the passage of a given temperature-time combination in that a message is visible initially and then becomes obscured due to permeation of oxygen through the walls of the package and oxidation of an oxidizable material sealed within the package, preferably in the form of a solution surrounding the message-conveying means. For example, the message may read "Acceptable" of "Safe for use" or may otherwise indicate that the product to which the indicator is attached should be safe for use as long as the message remains legible. When the message becomes obscured, it is apparent that the product has been stored too long at too high temperatures to be acceptable or safe for use.

One system of this type is a transparent self-supporting plastic film, such as methyl cellulose, containing ferrour chloride and phosphoric acid dispersed throughout the methyl cellulose film. When a freshly prepared film containing a suitable concentration of ferrous chloride and phosphoric acid in methyl cellulose of approximately 50-centipoise viscosity is superimposed on a message-conveying means and the film and message-conveying means are sealed under an inert gas inside a pouch made of a laminate of polyethylene film and polyethylene terephthalate film, the film is a pale yellow color and transparent initially. However, as time passes in an oxygen-containing atmosphere, oxygen permeates through the walls of the pouch and into the matrix of the film containing the ferrous chloride and phosphoric acid. The film changes from transparent pale yellow to dark brown because of the oxidation of the iron to the ferric state and the formation of rusty brown ferric oxide when all of the phosphate has been consumed. The film becomes opaque in time. The time of development of the brown color can be controlled to a considerable degree by varying the amount of phosphoric acid as well as the amount of ferrous iron initially present.

It is necessary to determine for a given food product packaged in a certain manner how long it can be stored at a given temperature before the food becomes unfit for use. With this information in hand, one can then select the type and specific composition for the temperature-time integrating indicator which will reveal the desired warning message after that length of time when maintained under that temperature condition. Then, even though the temperature may vary during storage of the food, the similarity of the dependency on temperature and time of the rate of chemical reaction in the food and the rate of oxygen permeability of the plastic film used with the indicator will cause the indicator to integrate the effects of temperature and time sufficiently closely to provide a very satisfactory warning indication relative to the food.

In the examples above, the message-conveying means comprises a white fabric or piece of white filter paper. Such a background field produces great contrast with respect to the message applied thereto with dark ink. Under some circumstances it may be desirable to have very low contrast between the message and the background of the message-conveying means. This may be accomplished in various ways. For example, the message-conveying means may be dyed or pigmented so as to produce low contrast with the message. One method of accomplishing this is to dye or pigment the fabric or paper of the message-conveying means to substantially the color of the legibility-controlling means when it is in its reduced state. Another method would be to apply the message to the background of the message-conveying means with an ink or paint of dye of such a low contrast to the background that it will not be visible through the visibility-controlling means until substantially all of the visibility-controlling means has become oxidized. This is of greater importance in making long-term temperature-time integrating indicators since in such cases there is a greater tendency for the visibility-controlling means to be converted to the oxidized state very gradually and thus not produce a sharp color or visibility change within a short period of time. Reducing the contrast helps in sharpening the end point in the determination of when a certain action dictated by the message should be taken.

It will be apparent that we have provided a highly useful device for integrating temperature and time in atmospheric environment storage. Control of temperature has been relatively easy. Keeping track of the passage of time likewise has been easy. But for the first time our invention provides a simple means for integrating temperature and time and providing a warning message which may be employed for indicating the safe limit of storage of foods or other products where storage life depends on the temperature and time of storage. Persons skilled in the art will understand that the temperature-time integrating indicator of the invention may be applied to other products which are adversely affected by temperature and time of storage, of which there are many since it is well-known that change due to chemical reaction in a material, no matter how slow, depends on temperature and time. This includes large numbers of organic products, such as drugs, vitamins, cosmetics, paints, rubber products, photograpnic films, ammunition, as well as many other products and materials.

Having described a considerable number of variations and specific examples of our invention, we wish it to be understood that they are illustrative in nature and may be departed from, while still remaining within the spirit and scope of our invention. We, therefore, refer to the appended claims, which define the scope of our aforesaid invention.

We claim:

1. A temperature-time integrating indicator for use in an oxygen-containing environment, said indicator comprising a sealed container at least a portion of which is transparent, said container being permeable to oxygen at a rate which increases as the temperature of said container increases, a message-conveying means positioned with respect to said container to be in a line of sight through said transparent portion of said container, means for controlling the legibility of said message-conveying means through said transparent portion of said container, said legibility-controlling means being in a chemically reduced state, being subject to oxidation to an oxidized state, and being sealed within said container, whereby the legibility of said message-conveying means is changed upon oxidation of said legibility-controlling means when a predetermined quantity of oxygen permeates said container.

2. A temperature-time integrating indicator as in claim 1, wherein said legibility-controlling means in the reduced state is sufficiently opaque to prevent legibility of said message-conveying means through said transparent portion, but in the substantially completely oxidized state becomes sufficiently transparent to provide legibility of said message-conveying means through said transparent portion.

3. A temperature-time integrating indicator as in claim 1, wherein said legibility-controlling means in the reduced state is sufficiently transparent to provide legibility of said message-conveying means through said transparent portion, but in the substantially completely oxidized state becomes sufficiently opaque to prevent legibility of said message-conveying means through said transparent portion.

4. A temperature-time integrating indicator as in claim 2, wherein said legibility-controlling means comprises a redox dye in its reduced state and a solution capable of absorbing oxygen which permeates said container and of oxidizing said redox dye to its oxidized state.

5. A temperature-time integrating indicator as in claim 4, wherein said solution comprises sufficient zinc in aqueous alkali to maintain said redox dye in its reduced state for a predetermined temperature-time combination.

6. A temperature-time integrating indicator as in claim 4, wherein said redox dye is sodium anthraquinone beta-sulfonate.

7. A temperature-time integrating indicator as in claim 2, wherein said legibility-controlling means comprises metallic copper and a solution capable of absorbing oxygen which permeates said container and of oxidizing said copper to its oxidized state.

8. A temperature-time integrating indicator as in claim 7, wherein said solution comprises sufficient ammonia to convert substantially all of said metallic copper into soluble copper-ammonia complexes under the influence of said oxygen which permeates said container.

9. A temperature-time integrating indicator as in claim 3, wherein said legibility-controlling means consists essentially of a transparent self-supporting methyl cellulose film containing ferrous chloride and phosphoric acid dispersed throughout said film.

* * * * *